United States Patent [19]

Charle et al.

[11] 3,714,049

[45] Jan. 30, 1973

[54] AEROSOL STAIN-REMOVING COMPOSITION

[75] Inventors: Roger Charle, Soisy; Grégoire Kalopissis, Paris; Charles Zviak, Franconville, all of France

[73] Assignee: Societe anonyme dite: L'Oreal

[22] Filed: Feb. 4, 1970

[21] Appl. No.: 8,727

[30] Foreign Application Priority Data

Feb. 4, 1969 Luxembourg ...........................57896

[52] U.S. Cl. ...................252/90, 252/163, 252/172, 252/305, 252/316, 252/364
[51] Int. Cl. .......C11d 17/00, C09k 3/30, B01j 13/00
[58] Field of Search ...........................424/14, 45–47; 252/305, 316, 364; 401/132, 190; 222/192, 392; 252/90, 163, 172

[56] References Cited

UNITED STATES PATENTS

| | | | |
|---|---|---|---|
| 3,265,630 | 8/1966 | Jensen | 252/316 |
| 2,959,325 | 11/1960 | Beard | 222/1 |
| 3,081,223 | 3/1963 | Gunning et al. | 252/305 X |
| 3,360,472 | 12/1967 | Renold | 252/305 X |
| 3,351,560 | 11/1967 | Brown et al. | 252/364 X |
| 3,150,048 | 9/1964 | Hollub et al. | 424/61 |
| 3,342,740 | 9/1967 | Kazmierczak et al. | 252/364 |
| 2,980,941 | 4/1961 | Miller | 15/104.93 |
| 3,196,478 | 7/1965 | Baymiller | 401/132 |
| 3,334,374 | 8/1967 | Watkins | 401/196 |
| 3,334,790 | 8/1967 | Eaton | 222/107 |

Primary Examiner—Shep K. Rose
Attorney—Cushman, Darby & Cushman

[57] ABSTRACT

A sprayable aerosol stain-removing composition contained under pressure in a container therefor includes an aerosol propellant, a stain-removing agent and a finely divided solid absorbent. Either or both of the stain-removing agent and finely divided solid absorbent are microencapsulated in a polymeric material inert to both the propellant and the stain-removing agent.

3 Claims, No Drawings

AEROSOL STAIN-REMOVING COMPOSITION

This invention relates to a new aerosol stain-removing composition for removing stains from a surface by spray application. It is known that heretofore stain-removing compositions have been made up of a mixture of solvents or stain-removing agents for dissolving the fatty substances which have caused stains on a surface, and absorbing powders for absorbing these fatty substances once they have been dissolved and removed from the surface and that such a mixture has been used in the form of an aerosol and sprayed onto a surface from which stains are to be removed.

It is also known that when it is desired to use stain removers in the form of an aerosol, several disadvantages have been experienced. For instance, it has been found that the stain-removing agent or solvent can dissolve the protective varnish coating the inside metal wall of an aerosol container if directly in contact therewith, thereby exposing the metal to the stain-removing compound and effecting a change in the formulation of the stain-removing agent. The second disadvantage is the fact that in conventional compositions the absorbing powder or agent is sprayed at the same time as the stain-removing agent, although generally it is more desirable to separate in time the action of the stain-removing agent and the action of the absorbent so that the stain-removing agent can dissolve the fatty substances without any interference that might be occasioned by the co-presence of the absorbent.

The present invention overcomes these and other disadvantages of conventional stain-removing compositions by providing a sprayable aerosol stain-removing composition which comprises
a. a propellant selected from the group consisting of saturated aliphatic hydrocarbons and a compound of the group of fluorochloroalkanes;
b. a stain-removing agent and
c. a finely-divided solid absorbent, at least one of (b) and (c) being encapsulated in a microcapsule having a diameter ranging from about 50 to 800 microns.

As the propellant mentioned under (a) there can be used a saturated aliphatic hydrocarbon such as propane, isobutane, n-butane or a fluorinated hydrocarbon such as trichloromonofluoromethane, dichlorodifluoromethane, dichloromonofluoromethane, monochorodifluoromethane, 1,2-dichloro, 1,1,2,2-tetrafluoroethane, 1,1-dichloro-1,2,2,2-tetrafluoroethane and 1-chloro-1,1-difluoroethane. Ordinarily, the quantity of propellant is used which gives a gauge pressure of about 1 to 4 atmospheres and generally there are used per 100 parts of the aerosol stain-removing composition, about 30–80, preferably about 40–70 parts by weight of the propellant.

As the stain-removing agent mentioned under (b) there can be used trichloroethylene, essence of turpentine, methylene chloride, carbon tetrachloride, tetrachloroethylene, naptha (petroleum ether), benzene, etc. Other compounds can also be admixed with these conventional stain-removing agents, for instance diluents such as isopropylalcohol and the like and essences C and F.

As the finely-divided solid absorbent mentioned in (c), there can be used silicon powder, talcum powder, or the like. Generally, the weight ratio of stain-removing agent to absorbent on a propellant-free basis can range about 20–5:1.

The polymeric material used to make the microcapsules utilized in the present invention can be any of those conventionally employed such as polyvinyl alcohol, polyethylene, polypropylene, polystyrene, polyacrylamides, polyethers, polyesters, polyamides, polybutadiene, polyisoprene, silicones, epoxy resins and polyurethanes. The choice of polymeric material will depend upon the choice of stain-removing agent and propellant employed but in any event the polymeric material of the microcapsule must be essentially inert with respect to the stain-removing agent and propellant, i.e., the stain-removing agent and propellant should not be a solvent for said polymeric material. On the other hand, depending on the system desired, the polymeric material can be either permeable or impermeable with respect to the propellant employed.

For instance, in one embodiment of the present invention the stain-removing agent is mixed with the propellant contained in the aerosol bomb type can and the microcapsules placed in suspension in this liquid medium contain only the finely-divided absorbent. In this case, it is preferred that the walls of the microcapsules be impermeable to the propellant and in this instance the walls or linings of the microcapsules can be made of polyvinyl alcohol. At the time of utilization of such a stain-removing composition, the aerosol sprayed onto the stained surface contains free stain-removing agent and microcapsules of the absorbent. The stain-removing agent immediately dissolves the fatty substances which caused the stain on the surface. Thereafter, the user rubs the surface at the spot where the stain is located in order to crush the microcapsules and to free the absorbent. There is thus obtained a separation of the dissolving phase by the stain-removing agent and of the absorption phase of the fatty substances by the absorbent.

In another embodiment of the invention, the microcapsules containing the absorbent and microcapsules containing the stain-removing agent are mixed together with the propellant in the aerosol bomb type can. In this instance, if the microcapsules are not permeable to the propelling fluid, the stain-removing composition is activated by rubbing the surface at the place where the aerosol was sprayed. This frees the stain-removing agent, as well as the solid absorbent contained in the microcapsules by crushing them. It is preferred, however, that the walls of at least a part of the microcapsules be permeable to the propellant and more particularly the walls of the microcapsules which contain the stain-removing agent.

When the propellant is a mixture of freons, for example, microcapsule walls made of polyethylene can be used to this effect. In this case, when the user sprays the aerosol onto the desired surface where there is a stain, the microcapsules which are permeable to the propellant reach atmospheric pressure. Because of the permeability of the walls, the microcapsules contain some of the propellants at the pressure existing inside of the aerosol can. As a result, these microcapsules burst just at the time when they reach the surface area.

This arrangement does not cause a separation between the dissolving phase and the absorption phase unless the stain-removing agent is encapsulated in microcapsules which are permeable to the propellant while the microcapsules housing the absorbent are not. This arrangement prevents any risk of dissolving the protective varnishes placed on the walls of the aerosol can. It is also clear that a similar result could be obtained by placing just the stain-removing agent into the microcapsules with the remaining ingredients of the stain-removing composition being suspended in the propellant.

It is also preferred that each microcapsule in the stain-removing composition contain a single ingredient other than the propellant, the formulation of the overall stain-removing composition being obtained by mixing, in the desired proportions, microcapsules containing each of the ingredients.

The microcapsules used in the present invention can be made by any appropriate conventionally known means and, in particular, by mechanically centrifuging products to be microencapsulated by means of a liquid film of product intended to form the wall of the microcapsules. Representative means and processes for encapsulating the ingredients of the stain-removing composition of this invention can be found, for instance, in U.S. Pat. No. 3,015,128.

The following examples illustrate the invention, the parts being by weight unless otherwise stated.

EXAMPLE 1

Microcapsules of about 300 microns in diameter are made whose walls are made of polyethylene with a low melting point. The microcapsules are made in such a way that the walls represent about 5 percent in weight of the ingredient contained therein.

The following ingredients are housed in these microcapsules, each microcapsule containing a single ingredient: methylene chloride, essences C and F, isopropyl alcohol, essence of turpentine, trichloroethylene, silicon, talc.

An essentially homogeneous mixture of these microcapsules is then produced according to the following formulation:

| | |
|---|---|
| microencapsulated methylene chloride | 15.5 g |
| microencapsulated C and F essences | 40 g |
| microencapsulated isopropyl alcohol | 15 g |
| microencapsulated essence of turpentine | 10 g |
| microencapsulated trichloroethylene | 7.5 g |
| microencapsulated silicon powder | 4 g |
| microencapsulated talc | 8 g |

Into an aerosol bomb can, 65 g of these microcapsules are placed. Into the can there is also introduced 40 g of a mixture of 35 percent dichlorodifluoromethane and 65 percent trichlorofluoromethane.

When the user wishes to activate the above defined composition, he presses on the spraying mechanism of the can containing said composition and sprays the aerosol onto the stain on the surface, after having shaken the can. The microcapsules which are ejected from the can explode upon hitting the free air and the mixture of stain-removing agent and absorbent is released at the time the aerosol is sprayed onto the surface. The stain-removing agent dissolves the fatty substances which is absorbed by the absorbent. After the stain-removing agent has essentially evaporated, the user brushes the surface to eliminate the absorbent, leaving an essentially stain-free surface.

EXAMPLE 2

Microcapsules of about 200 microns in diameter are made of polyvinyl alcohol. These microcapsules contain, separately, silicon powder and talcum powder. The ratio of the weight of the walls of the microcapsules to the weight of the powder contained in the microcapsules is about 5 percent.

An essentially homogeneous mixture of the aforementioned microcapsules is made so as to obtain the following formulation:

| | |
|---|---|
| microencapsulated silicon powder | 33.3 g |
| microencapsulated talcum powder | 66.7 g |

Into an aerosol bomb can there is placed 8 g of these microcapsules. The following stain-removing agent is also introduced into the can:

| | |
|---|---|
| methylene chloride | 9.3 g |
| essences C and F | 24 g |
| isopropyl alcohol | 9 g |
| essence of turpentine | 6 g |
| trichloroethylene | 4.5 g |
| liquid butane | 40 g |

The can is then closed and equipped with a spraying mechanism.

When the user wants to use this composition, he presses the spraying mechanism on the can and sprays the aerosol onto a stain on the surface, after having shaken the can. The aerosol deposits the stain-removing agent on the stain and this agent dissolves the fatty substances of the stain. At the same time the microcapsules are sprayed onto the surface, but they do not burst so that the absorbent does not act during the time that the stain-removing agent is exerting its dissolving power. After approximately 15 seconds, the user brushes with his hand the place where the stain is located so as to cause the microcapsules to burst and to free the absorbent. He then waits for substantially complete evaporation of the stain-removing agent and he then brushes the place where the stain is located to eliminate the absorbent which is loaded with the fatty substance.

It will also be recognized that the microcapsules which are used can be composed of not just a single lining, but of several linings which are superimposed, the inside lining being inert with respect to the microencapsulated products and the outside lining being inert with respect to the environment into which the microcapsules are placed.

EXAMPLE 3

Example 2 is repeated except that the stain-removing agent is encapsulated in polyethylene microcapsules. On discharge from the can, these microcapsules burst and the stain-removing agent is selectively released onto the stained surface.

We claim:
1. A sprayable aerosol stain-removing composition for removing stains from a surface, said composition contained under pressure in a container therefor and comprising
   a. a propellant selected from the group consisting of propane, isobutane, n-butane, trichloromonofluoromethane, dichlorodifluoromethane, dichloromonofluoromethane, monochlorodifluoromethane, 1,2-dichloro 1,1,2,2-tetrafluoroethane, 1,1-dichloro 1,2,2,2-tetrafluoroethane, 1-chloro 1,1-difluoroethane and mixtures thereof, b. a stain-removing liquid agent selected from the group consisting of trichloroethylene, essence of turpentine, methylene chloride, carbon tetrachloride, tetrachloroethylene, naphtha, benzene and mixtures thereof said (b) stain-removing liquid agent being dispersed unencapsulated by itself in said (a) propellant, and without any (c) finely-divided solid stain absorbent and c. a finely-divided solid stain absorbent selected from the group consisting of silicon powder and talcum powder, said solid stain absorbent (c) being encapsulated by itself and without any (b) stain removing liquid agent in a microcapsule having a diameter ranging from about 50 to 800 microns, said microcapsule being made from a polymeric material inert with respect to said stain-removing agent and said propellant and being impermeable to the propellant so that the pressure within said microcapsule is essentially equal to ambient pressure whereby on discharge of the microcapsule from said container onto a surface containing a stain to be removed at ambient pressure, said microcapsule remains intact, with the further proviso that some of said liquid stain removing agent may also be encapsulated in a microcapsule made of a polymeric material which is permeable to said propellant so that the pressure within said micro-capsule is essentially equal to the pressure within said container and is greater than atmospheric pressure whereby on discharge of the microcapsule from said container onto a surface containing a stain to be removed at ambient pressure, said microcapsule bursts, thereby releasing said stain-removing agent whereby although sprayed at the same time, the action of the unencapsulated liquid stain remover is immediate and desirably separate in time from the encapsulated solid absorbent, thereby limiting any interference that might be occasioned by the copresence of the absorbent, said absorbent being freed from the microcapsule by rubbing the surface at the sopt where the stain was located and the aerosol was sprayed.

2. The sprayable aerosol stain-removing composition of claim 1 wherein said finely divided solid stain absorbent is encapsulated in polyvinyl chloride microcapsules.

3. The sprayable aerosol stain-removing composition of claim 1 wherein said finely-divided solid stain absorbent is encapsulated in polyvinyl chloride microcapsules and said stain-removing agent is encapsulated in polyethylene microcapsules.

* * * * *